May 26, 1942.　　F. H. VAN NEST　　2,284,457
RELIEF VALVE
Filed Oct. 11, 1940
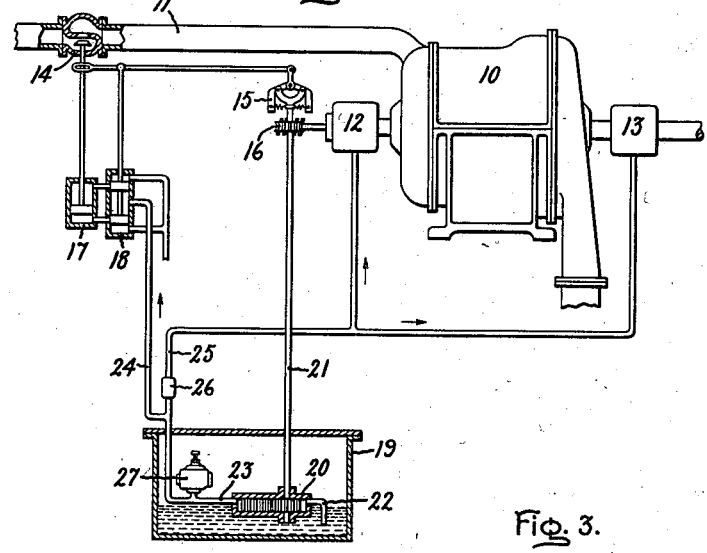
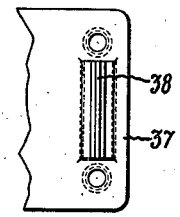
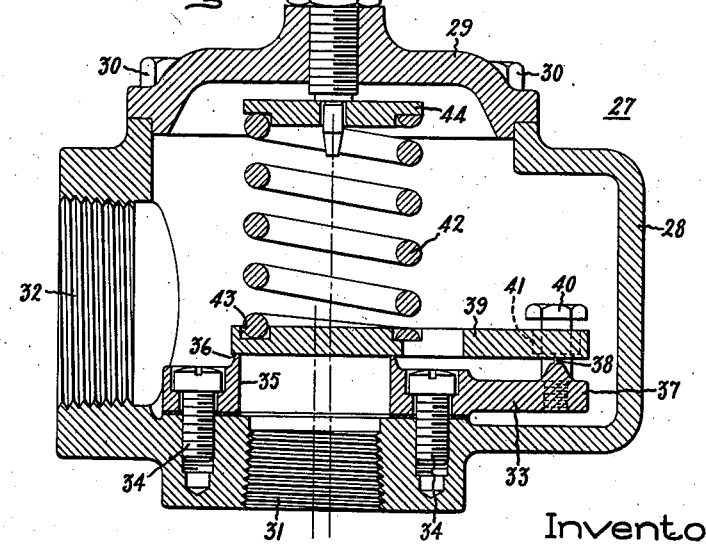
Inventor:
Francis H. VanNest,
by Harry E. Dunham
His Attorney.

Patented May 26, 1942

2,284,457

UNITED STATES PATENT OFFICE 2,284,457

RELIEF VALVE

Francis H. Van Nest, Saugus, Mass., assignor to General Electric Company, a corporation of New York Application October 11, 1940, Serial No. 360,773

1 Claim. (Cl. 137—53)

The present invention relates to relief valves for discharging or relieving fluid from a system under fluid pressure as the pressure rises above a predetermined value. More specifically, the invention relates to the type of relief valves in which a movable valve member is spring-biased towards a seat.

The object of my invention is to provide an improved construction of relief valves whereby small movement of a valve member increases considerably the opening area for discharging fluid and whereby accurate fluid pressure may be maintained during varying operating conditions.

For a consideration of what I believe to be novel and my invention, attention is directed to the following description and the claim appended thereto in connection with the accompanying drawing.

In the drawing Fig. 1 illustrates an elastic fluid turbine mechanism with a relief valve embodying my invention; Fig. 2 is an enlarged sectional view of the relief valve; and Fig. 3 is a top view of a part of Fig. 2.

The arrangement in Fig. 1 comprises an elastic fluid turbine 10 with an inlet conduit 11 and bearings 12 and 13 for supporting the turbine rotor. A valve 14 in the inlet conduit 11 serves to control the flow of fluid therethrough. The valve is positioned by a known type of speed governing mechanism including a speed governor 15 driven from the turbine shaft through a worm gear 16 and a hydraulic servo motor 17 connected to the valve 14 and a pilot valve 18 for controlling the displacement of fluid in the motor 17. Both the governing mechanism, that is, the hydraulic servo motor, and the bearings 12 and 13 require oil or like operating fluid under pressure during operation. To this end a fluid pressure system is provided which includes a tank 19 containing oil and a gear pump 20 disposed within the tank 19 and driven by a shaft 21 from the turbine shaft through the aforementioned worm gear 16. The pump has an inlet conduit 22 projecting into the oil space in the tank and a discharge conduit 23 connected by branch conduits 24 and 25 to the hydraulic motor and the bearings respectively. As the pressure required for the bearings is substantially lower than that required for the hydraulic motor, a pressure-reducing device such as an orifice 26 is built into the branch conduit 25.

The amount of oil required by the bearings 12 and 13 is substantially constant, whereas the amount of oil necessary for actuating the hydraulic motor varies with varying operating conditions. During fixed turbine load, except for a small amount to make up for leakage, no oil is required by the hydraulic motor. During a sudden considerable load change on the turbine the hydraulic motor has to move a considerable distance and requires a substantial amount of oil under pressure to effect such movement.

The oil pump 20 normally furnishes a constant amount of oil sufficient to satisfy maximum demand for oil under pressure by both the bearings and the hydraulic motor. The amount of oil furnished in excess of that required under a particular load condition has to be bypassed or relieved from the system. This is accomplished by the provision of a relief valve 27 connected to the pump discharge conduit 23 for discharging from the conduit 23 an amount of oil equal to the difference of the amount furnished by the pump and the amount required by the bearings, hydraulic motor and like elements connected to receive oil from the system. In this manner the oil pressure is maintained substantially constant in the branch conduits 24 and 25 during varying operating conditions.

The relief valve 27 according to my invention comprises a casing 28 with a cover 29 secured to the casing by bolts 30. The casing forms an inlet 31 for connection to the fluid pressure system and an outlet 32. A plate 33 is secured to the inlet portion of the casing by a plurality of screws 34. The plate has an opening 35 in alinement with the inlet 31 and forms a valve seat 36. An extension 37 of the plate forms a knife-edge bearing 38. A movable valve member or plate 39 is arranged in cooperative relation with the seat 36 and has an extension engaging the knife-edge bearing 38. The plate 39 is loosely guided by two pins 40 adjacent the opposite ends of the knife edge. The pins 40 are screwed into the extension 37 of the plate 33 and form a clearance with openings 41 in the valve plate 39. The plate 39 is biased towards the valve seat 36 by a coiled spring 42 having a lower end positioned in a groove 43 formed in the valve plate and an upper end engaging a spring plate 44. The latter is held on the lower end of an adjustable screw-threaded rod 45 centrally projecting through the cover 29.

The spring 42 is eccentrically arranged with regard to the valve seat. More specifically, the center line of the spring is located between the center line of the valve seat and the knife-edge bearing. The eccentric arrangement between the spring and the valve seat is important because in this manner the right-hand portion of the valve plate is maintained in contact with the knife-edge bearing 38 during movement of the valve plate. If the axis of the spring were not slightly offset with regard to the axis of the valve seat, the oil pressure would have a tendency to lift the whole valve plate rather than rotate it about the knife edge. Under this condition the valve plate would be floating on the oil stream and free to move about by the amount of clearance between the guide screws 40 and the holes 41 in the valve plate. Such free movement would render the valve operation unstable and cause chattering. With the spring offset, as described above, there is at all times a definite downward reaction on the knife edge which assures the valve plate rotating about rather than being lifted off the knife edge.

During operation a decrease in demand for fluid under pressure from the system causes an increase in pressure in the conduit 23 whereby the valve plate 39 is forced upward, turning about the knife edge 38 against the biasing force of the spring 42 to discharge an increased amount of fluid from the system and thereby to maintain the fluid pressure in the system substantially constant. In the present example, where the relief valve is located inside the tank, the fluid discharged through the outlet 32 is directly returned to the tank.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

Relief valve comprising a casing having an inlet and an outlet, a member secured within the casing and forming a valve seat adjacent the inlet and a knife edge bearing spaced from the seat, a rigid valve plate having a portion in cooperative relation with the seat and another portion for engaging the knife edge bearing, means biasing the valve plate towards the seat and towards the bearing and to maintain engagement between the plate and the bearing during movement of the plate, said means consisting of a single helical spring having an end portion seated on the plate with its axis slightly off center with respect to the seat in the direction of the bearing, a spring plate engaging the other end of the spring and an adjustable bolt engaging the spring plate and projecting through the casing.

FRANCIS H. VAN NEST.